Sept. 8, 1959  R. K. ARROWSMITH ET AL  2,902,775
EDUCATIONAL DEVICE

Filed March 14, 1955  2 Sheets-Sheet 1

INVENTORS
Jessie M. Arrowsmith
Robert K. Arrowsmith

Sept. 8, 1959     R. K. ARROWSMITH ET AL     2,902,775
EDUCATIONAL DEVICE
Filed March 14, 1955     2 Sheets-Sheet 2
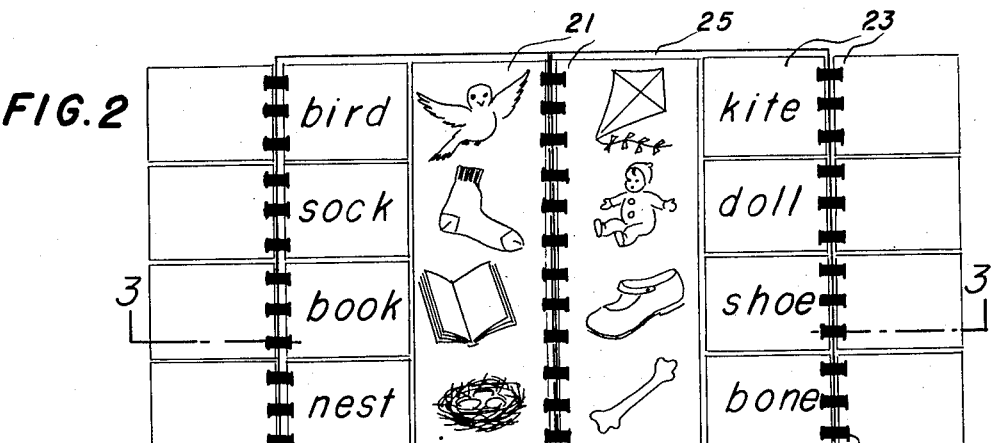
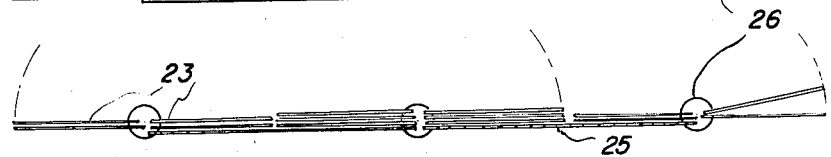
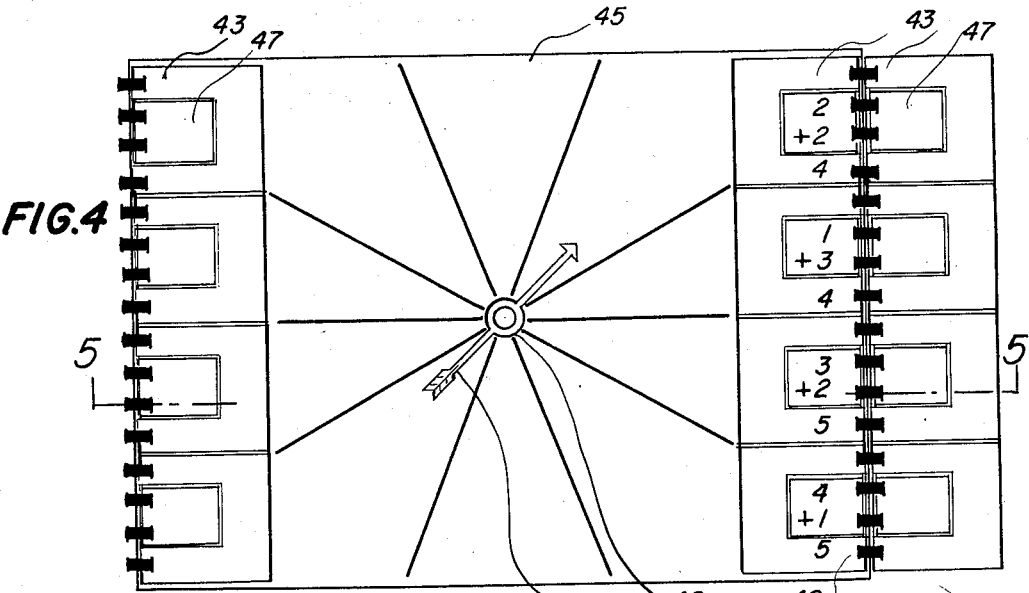
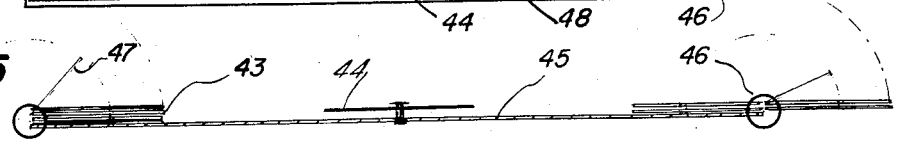
INVENTORS
Jessie M. Arrowsmith
Robert K. Arrowsmith 2,902,775
Patented Sept. 8, 1959

United States Patent Office

2,902,775
EDUCATIONAL DEVICE

Robert K. Arrowsmith and Jessie M. Arrowsmith, Sherwood, Oreg.

Application March 14, 1955, Serial No. 493,909

9 Claims. (Cl. 35—9)

Our invention relates generally to educational devices for use in school or at home for teaching speech, reading, arithmetic and phonetics to children of primary grade or kindergarten age.

More particularly the invention relates to a game of matching cards to teach the child by association of specific information on the matched cards and to provide the child with the feeling of success, security and confidence in his ability which proof of his correct matching of the cards will give him.

It is a primary object of this invention to provide means for teaching selected information and thinking practice to children of primary and kindergarten grades.

It is a second object to provide such a teaching means including multiple pairs of cards having respectively related indicia formed on the matching surfaces of each of the two cards of one of the multiple pairs.

It is a third object to provide such a teaching means in which on the reverse side of one of the cards of a matching pair is formed reference indicia to prove that the cards are properly associated in the same pair.

It is a fourth object to provide such a teaching means with a stiff back board to which all of the multiple pairs of matching cards are hingedly attached.

It is a fifth object to provide such a teaching means in which the cards of a group of pairs of matching cards having the similarly used cards of each pair of the group associated on the back board in a uniform way.

It is a sixth object to provide such a teaching means in which a plurality of groups of pairs of matching cards are hingedly attached to the back board and separated thereon in a desired spacing whereby a plurality of children can work one each with each of the groups of pairs of matching cards.

It is a seventh object to provide such a teaching means in which a plurality of children can each manipulate in turn one of his individual pairs of cards in his individual group of cards.

It is an eighth object to provide such a teaching means with chance means for determining the order in which a plurality of children can each manipulate one of his individual pairs of cards in his individual group of cards.

How these and other objects are attained will be understood from the following disclosure referring to the attached drawings in which:

Fig. 2 is a plan view of a second species form in which our generic invention may be practiced.

Fig. 3 is a view in sectional elevation along the line 3—3 of Fig. 2.

Fig. 4 is a plan view of a third species form in which our generic invention may be practiced.

Fig. 5 is a view in sectional elevation along the line 5—5 of Fig. 4.

Figure 1:
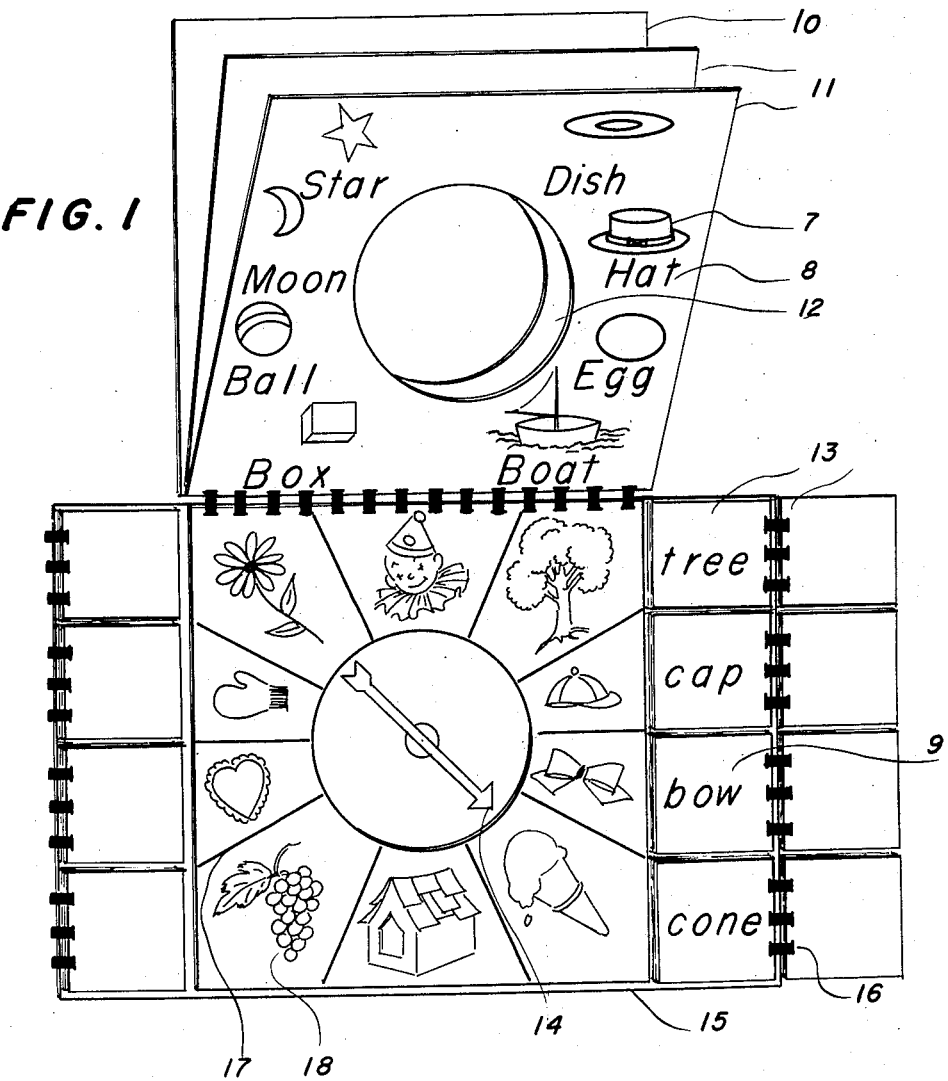
Fig. 1 is a plan view in partial perspective of a first species form in which our generic invention may be practiced.

Referring now to the drawings the more elegant form in which our invention is shown to be practiced is the first species form of Fig. 1 in which a back board 15 has hinged to its upper edge by hinges 16 a series of illustrated cards 11, each card having its own illustrations only on its obverse face as shown in the lower part of Fig. 1 and on its reverse face the same illustrations associated with the word name thereof as shown in the upper part of Fig. 1. Rotatably secured at the center of back board 15 as shown is a spin arrow 14 and each of the cards 11 have a central hole 12 formed therethrough to clear the spin arrow 14 when the cards 11 are positioned obverse face up on back board 15. A cover board 10 is for the purpose of covering the cards 11 and the spin arrow 14 when the device is not in use.

On the obverse faces of cards 11 it is seen that radial lines 17 are placed to bound the sectors in which the individual illustrations are contained for the purpose of leaving no doubt as to the illustration indicated by the point of arrow 14.

Hingedly secured by hinges 16 to both lateral edges of back board 15, as shown, are a plurality of small multiple choice cards 13, in eight separate books each book having an unprinted cover card and additional cards 9 each printed with the name of the illustration in the adjacent sector of one of the top hinged cards 11.

One of the important levels in first grade reading is the recognition of words beginning in either upper or lower case letters. To give practice in such recognition of words we have placed the words beginning with upper case letters, numbered 8, on Figure 1, on the reverse side of the intermediate leaves, and the words beginning with lower case letters on the multiple-choice cards, numbered 9 on Figure 1, or vice versa.

The device depicted on Figure 1 is played as a self-teaching device or as a puzzle by matching the correct symbols on the multiple-choice cards, numbered 13, to the indicia numbered 18, on the intermediate leaves, numbered 11. If the child feels insecure as to the correct response he may lift the intermediate leaf and find the picture, numbered 7, and its corresponding symbol, numbered 8, on the reverse side of the intermediate leaf. This is important because it gives the beginner an area of reference which is necessary to independent study.

Rules of play for the device depicted in Figure 1 when used as a game: Any number of children may play, each child having a device, or two children may share a device, each playing one side. The multiple-choice cards are turned outward from the center. Count out for first play. Play progresses clockwise. Beginner strikes spinner. When spinner comes to rest on a sector, player turns the multiple-choice cards to the correct answer leaving it in an exposed position. If the pointer comes to rest on the sector indicating clown, then the player wins another spin. If the pointer comes to rest on the dog house sector the play passes clockwise. The first player to have all of his multiple-choice cards in correctly exposed position wins. If the children are still in the learning stage of the indicia they should have the privilege of consulting the area of reference before making the selection of the multiple-choice card. If consultation of the area of reference is to be allowed in the game it should be predetermined before the play begins.

In Figs. 2 and 3 is shown the second species disclosed for the practice of our invention. This species includes a pair of back boards 25 to the adjacent edges of which are hingedly secured by hinges 26 as shown a pair of books of elongated cards 21 each having a plurality of individual illustrations on its obverse side, as shown, and similarly located on its reverse side, not shown, the same individual illustrations are accompanied each by its word name.

Along the opposite lateral edges of back boards 24 are hingedly secured, as shown, a plurality of books of multiple choice cards 23. Each book of multiple choice cards has its open end adjacent the open end of one of the books of elongated cards 21 at one of the illustrations thereon, there being the same number of books of multiple choice cards 23 that there are illustration positions on the cards 21. There is a respective multiple choice card 23 marked with the name of each respective illustration on the cards 21 and positionable adjacent thereto. No cover cards for the books of cards 21 and 23 are required for by folding cards 23 inwardly and then folding back boards 25 inwardly it is seen that the structure stores as a compact package covered by back boards 25.

In many respects like the species of Fig. 1, the species of Figs. 2 and 3 can be used by a child as a self teaching device or simple puzzle by matching the names on the multiple choice cards 23 with the appropriate illustrations on cards 21 and then reversing the card 21 to prove the correctness of his choice. It however it is desired to use the Fig. 2 device as a game in which a plurality of children can participate each of the children should use a separate device and any chance method can be used to determine the order of play. Chance methods found to be satisfactory have been to indicate the eight playing positions by separate number or colors to be matched by an eight sided dice or an arrow spinner card marked with similarly numbered or colored positions.

In Figs. 4 and 5 is shown the third species disclosed for the practice of our invention. This species includes a back board 45 along the lateral edges of which are shown hingedly secured thereto a plurality of pairs of books of question and answer cards each pair of cards of each pair of books being a U-shaped card 43 hinged by its legs to back board 45 and a smaller rectangular card 47 hinged at one side to back board 45 to substantially fill (but with clearance to work through) the interior opening in the U-shaped card. This form of pair cards is particularly adaptable where the device is used in teaching the meaning and use of numbers for in this case, as shown, the answer card has need only to be marked. Each of the cards 47 will have on its obverse side what can be considered a question of the form 2+2 while its mating card 43 will have on the obverse side what can be considered an answer in the printed number 4 as shown. The reverse side of the question card 47, not shown, would carry the answer number 4 and be considered the area of reference with which the child can prove the accuracy of his work and thus develop confidence and a feeling of security.

Rotatably carried on pivot 48 at the center of back board 45 is spin arrow 44. Radial lines, as shown, radiate from pivot 48 to divide the face of back board in sectors referring to particular pairs of books of cards which are to be played when the head of arrow 44 stops after spinning on a particular sector.

Like the other species shown the species of Figs. 4 and 5 can be used by a child as a self teaching device or simple puzzle by matching a so-called answer card 43 with a so-called question card 47 and using the area of reference or correct answer side of card 47 to prove the accuracy of his work.

Again like the other species shown the species of Figs. 4 and 5 can be used as a game for a plurality of players wherein each of the players have an individual device and play in turn with the pair of cards indicated by the spin arrow which he spins as it becomes his turn to play. Or, of course, two players can play on the same device by playing not in alternate turns but rather will each player play only when the arrow head stops on a sector on his side of the board. As in the species of Fig. 1 rules can be decided upon to use the upper and lower sectors as bonus or penalty sectors.

It may or may not be desirable to set rules for terminating or winning or losing a game. The devices are of such playing nature that such rules can be made up and applied easily but it is probably best with these small children not to introduce the concept of winning or losing one over the other until the children have developed greater personal assurance to be able to withstand the sort of mental shocks involved.

Having thus listed some of the objects of our invention, illustrated and described three forms in which our invention may be practiced and explained their operation, we claim:

1. A multipart educational device for teaching speech, reading, arithmetic, and phonetics, all the parts thereof being secured together into a single integrated unit, said device comprising a stiff sheet back board, a plurality of books of small cards hingedly secured in columnar arrangement along the left and right lateral edges of said back board, each of the small cards being printed on their obverse faces with indicia serving as answer indicia, a book of large cards hingedly secured along the top edge of said back board between the columns of said small cards, a spin arrow rotatably secured on the top face of said back board at the center thereof, each of said large cards being formed with a clearance hole therethrough to clear said spin arrow when said card is hinged forwardly to surround said arrow, each of said large cards on its obverse side being printed with radial lines dividing the surface thereof into respective sectors the outer ends of which each register with an adjacent free end of a respective one of said books of small cards, each of said large cards within said respective sectors being printed with problem indicia related only to the answer indicia on the small cards of a book adjacent its particular sector, said large cards each being printed on the reverse sides thereof with the same indicia similarly placed as are formed on the respective obverse side thereof.

2. The device of claim 1 in which each of the indicia formed on the reverse side of said large cards is accompanied by its respective answer indicia as copied from its respectively mating small card whereby the reverse side of each of said large cards forms an area of reference for the problem indicia on the obverse side.

3. An educational device for teaching speech, reading, arithmetic and the like, comprising a back board and a pair of books of cards hingedly secured thereto, the cards of each book of said pair being secured to said back board by a hinge set spaced from the hinge set of the other of said pair of books whereby an unhinged side of any card of either of said books may be rotated about its hinged side into a matching position adjacent an unhinged side of any card of the other of said books, each card of one of said books forming a matching pair with one card of the other of said books, one of said cards of each of said pairs of matching cards being marked on its obverse side with a problem indicium and on its reverse side with an answer indicium for said problem indicium and the other of said cards of one of said pair of matching cards being marked on its obverse side with answer indicium for said problem indicium.

4. An educational device for teaching speech, reading, arithmetic and the like, comprising a back board, a first book of cards hingedly secured to said back board by a first hinge set and a plurality of second books of cards each respectively hingedly secured to said back board by a plurality of respective second hinge sets, each of said cards of said first book of cards being printed on its obverse side with a plurality of spaced problem indicia and on its reverse side with the same indicia similarly placed as are formed on the respective obverse side thereof, each of the problem indicia printed on the reverse sides of the cards of said first book being accompanied by its respective answer indicium printed thereon, each of said cards of each of said second books of cards being printed on its obverse side with an answer indicium for one of said problem indicia on one of said cards of said first book of cards, the number of said problem indicia on one face of one of said cards of said first book of cards being equal to the number of said second books of cards, said books of cards being so hinged on said back board that any of the cards of a respective one of said second books of cards may be moved about the hinge of that respective book to a position at which its obverse side will be upward and at which it will be adjacent a respective indicia position on said cards of said first book of cards when said cards of said first book are positioned about the hinge set of said first book with their obverse sides upward, and each of the problem indicia printed on the obverse side at the same position on all of the cards of said first book having a matching answer indicium on one of the cards of the respective second book of cards adjacent said same position on said cards of said first book.

5. The device of claim 4 including chance means for indicating a particular one of said plurality of second books the cards of which are to be matched with a particular position of the indicia on the cards of said first book to establish a problem and answer game therewith.

6. The device of claim 5 in which said chance means includes a spin arrow freely rotatably secured on said back board.

7. An educational device for teaching speech, reading, arithmetic and the like comprising a back board and a plurality of pairs of books of cards hingedly secured thereto, the cards of one book of each of said pairs of books being secured to said back board by a hinge set positioned with respect to the hinge set of the other book of each of said pairs of books whereby an unhinged side of any card of one of said books of each of said pairs of books may be rotated about its hinged side into a matching position adjacent an unhinged side of any card of the other of said books of each of said pairs of books, one of said cards of one book of said pair of books being marked on its obverse side with a problem indicium and on its reverse side with an answer indicium for said problem indicium and one of said cards of the other book of said pair of books being marked on its obverse side with an answer indicium for said problem indicium.

8. The device of claim 7 including chance means for indicating a particular pair of said plurality of pairs of books which are to next be studied.

9. The device of claim 8 in which said chance means includes a spin arrow freely rotatably secured on said back board.

References Cited in the file of this patent

UNITED STATES PATENTS

| | | |
|---|---|---|
| 1,076,257 | Wiltz | Oct. 21, 1913 |
| 1,445,819 | Boyle | Feb. 20, 1923 |
| 1,656,030 | Waring | Jan. 10, 1928 |
| 2,075,529 | Leubrie | Mar. 30, 1937 |
| 2,201,479 | Davidson | May 21, 1940 |
| 2,234,075 | Carolin | Mar. 4, 1941 |
| 2,676,019 | Steinberg | Apr. 20, 1954 |